United States Patent [19]

Bruinshorst

[11] 4,376,977
[45] Mar. 15, 1983

[54] COMPUTER SYSTEM WITH SCANNABLE PROGRAM MEMORY

[75] Inventor: Berend T. J. Bruinshorst, Eindhoven, Netherlands

[73] Assignee: U.S. Philips Corporation, New York, N.Y.

[21] Appl. No.: 178,646

[22] Filed: Aug. 15, 1980

[30] Foreign Application Priority Data

Aug. 27, 1979 [NL] Netherlands ................ 7906416

[51] Int. Cl.³ .............................................. G06F 9/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,893,084 | 7/1975 | Kotok et al. | 364/200 |
| 4,089,059 | 5/1978 | Miller et al. | 364/200 |
| 4,180,854 | 12/1979 | Walden et al. | 364/200 |
| 4,231,087 | 10/1980 | Hunsberger et al. | 364/200 |

Primary Examiner—Charles E. Atkinson

Attorney, Agent, or Firm—James J. Cannon, Jr.

[57] ABSTRACT

A computer system having a program memory for machine instructions to be executed and for other data not included in machine instructions to be executed, also a keyboard, a display device and a processor. In the program memory a quantity of such other data is preceded by a special code from a pre-determined set of not-to-be-executed machine codes plus an adjacent indication giving the address distance between the beginning and the end of the other data in question. A decoder that can address specifically the machine-code set is connected to the instruction register. An address-distance detector is also connected. Together, these elements generate a signal to process the quantity of other data in a specific way and, in particular, not to treat them as further machine instructions. In the design phase of a program, no large capacity memory is required for the text because all relevant information can be stored in a program memory of limited capacity because the machine program has a very compact notation.

8 Claims, 15 Drawing Figures

```
2500  C7 8F        PROGRAM EXAMPLE 2511  28           EORZ,R0
2512  C8 9F        STRR,R0        *2533
2514  C3           STRZ,R3
2515  8F 25 40     LODA,R0        2540+X3+1
2518  3F 7C F8     BSTA,UN        7CF8           ASCII TO BUFFER

251B  EB 23        COMR,R3        2540
251D  98 76        BCFR,EQ        2515           PROGRAM EXAMPLE 251F  09 94        LODR,R1        *2535
2521  81           LODZ,R1
2522  44 F8        ANDI,R0  F8                   11110000
2524  8A 14        LODR,R2        253A
2526  EE 45 3B     COMA,R0        253B+X2-1
2529  14           RETC,EQ 252A  5A 7A        BRNR,R2        2526

252C  65 06        IORI,R1  06                   00000110
252E  C9 87        STRR,R1        *2537
2530  17           RETC,UN

2531  C4 06        7F00 5E67  1F23

2539  C5 04        00 30 40 D0

253F  C6 0A        PATENT NO.

254B  40           HALT
```

COMPUTER SYSTEM WITH SCANNABLE PROGRAM MEMORY

BACKGROUND OF THE INVENTION

The invention pertains to a computer system having a program memory with a sequence of addresslocations for the storage of machine codes; a keyboard; a display device for at least one row of characters; and a processor. The processor includes at least an address register for the program memory, with an incrementing input; and an instruction register and further storage means together having a predetermined length for the storage of an instruction of not more than that pre-determined length read from the program memory. It further includes a first instruction-decoder connected to the instruction register and an execution element for the execution of a data processing operation under the control of a signal from the first instruction decoder. Said elements, are connected by information links for data signals and control signals.

The display means may comprise a printer or a cathode-ray tube or display element with plasma light sources for one or more rows of characters. The processor may comprise an arithmetic and logical element and further means for the processing and routing of data. Programs are often fed into computer systems as "source programs", e.g. via the keyboard. In the source program, a (source) instruction contains a group of e.g. four characters symbolic of the instruction, and further often additional indication, such as the name of one or more registers, from which data for the instruction to be carried out has to be obtained, or where the result of the operation has to be stored, the value of a parameter to be used or some other information. This makes the instruction easily recognizable to the programmer. A source instruction can be addressed by using the corresponding line number of a line-wise display of the same, so that modification of the program is possible. The disadvantage of the form mentioned is the large redundancy, because sometimes, for example, up to 20 alphanumeric characters can be necessary to represent a single instruction. The source program is therefore translated into so-called object code by a translating element (assembler). Symbolic addresses (line numbers) are thereby translated into the actual addresses of the program memory. The translating element can be continuously present in the computer system. Alternatively, it can be connected to translate the source program only once, so that it does not form a necessary part of the invention. The object code mentioned above comprises a sequence of machine instructions. A machine instruction contains an op(eration) code or machine code whereby the machine instruction is identified. Each different machine code is, as it were, symbolized by another number. Such a number is contained in a group of eight binary digits. Besides the number just mentioned, the machine instruction may also contain data or a reference to a memory address where special data are stored. These special data can, for example, be a text, a sub-routine and in appropriate cases data or addresses. In this way the object code can be considerably more compact than the source program and storage thus requires less memory space. In what follows it is assumed that the machine program is already stored for future use in the program memory.

In many cases it is necessary that the machine program is accessible to the programmer, for example to bring about certain modifications or to derive certain information from it, but without actually executing the program. Now, in addition to the instructions themselves (with the further data contained within the instructions), a machine program also contains information external to the instructions proper, such as text (commentary or titles), addresses (for example, a starting address of a group of data or jump addresses) and data. When the machine program is executed, this external information is processed differently from the machine instructions because the last instruction before such a group of external information is always a branching instruction, wherein reference is made to a specific address (or several addresses) in the computer; when such an address is called, the computer is preconditioned to be ready to process the information arriving from the program memory in the appropriate manner. In the design of a program, however, it is often advantageous to address the program memory directly, whereby for example the addresses are scanned sequentially. There is then in certain cases a risk that a non-instruction is decoded, which is not permissible. It will be remembered that in the source program this problem is non-existent because there addressing can be done by means of the line number.

SUMMARY OF THE INVENTION.

It is an object of the invention, in a computer according to the introduction, to implement simple means whereby data as above-mentioned not appertaining to a machine instruction is not decoded by the instruction decoder as a machine instruction to be executed, so that, especially in the design phase of a program, they can be addressed by the programmer in another way. Further, for decoding an instruction code to be implemented, it is an object of the invention that the address register of the program memory is always correctly set to the address (for example to op-code address) of a machine instruction, whereby the permanent presence of the source program in a memory of large capacity is no longer necessary. The invention realizes that object in that it further includes a second instruction decoder that can be coupled to the instruction register in order feed an activating signal, when triggered by a pre-determined machine-code set (110001 XX), to an activating input of an address distance detector. This detector is suitable for detecting address distance with a range whose upper limit contains at least the maximum content of an instruction, the address distance detector being provided with first means to receive a separate signal appertaining to the machine code in question of a first address distance in the program memory and thereupon generate a first control signal, second means to update the relative address distance covered in the program memory after the machine code mentioned and on reaching the address distance specified to generate a de-activating signal and to terminate the above-mentioned first control signal. This first control signal is suitable for setting the processor in a non-active mode for data arriving from the program memory after the above-mentioned separate signal.

Such an address distance detector can be a counter having a small counting capacity and the activating signal can be derived from one or more reserved machine codes by a simple decoding operation. In this way the machine code contains a sequence of data, for example information bytes, whereby no measures other than the introduction of these reserved machine codes are necessary to indicate whether a piece of information concerns an instruction part or a non-instruction part. The machine program thus still remains compact. The addition according to the invention permits the machine program, as it were, to contain pseudo-instructions, which may be very long and which, provided they are reached via the corresponding pseudo op-code are never decoded as actual machine instructions. Only a limited extra memory capacity is required for this purpose.

The processing of an instruction takes place in a number of stages:

(1) the instruction is read from the memory ("fetch").
(2) the op-code is decoded;
(3) from (1) and (2) the complete information content of the instruction is known;
(4) the instruction is (a) executed, (b) displayed as characters, (c) displayed as characters after translation back into a source instruction, or (d) modified;
(5) the instruction is re-written in the memory possibly at another address ("store").

For processing in a "non-instruction" mode, the element (2), (3) and (4) are thus always left out. Under control of a specific member from the above-mentioned predetermined machine code set, modifications may be made in a specific way both for data contained within a "normal" instruction and for data not contained in such an instruction. The operation (a), (b), (c) or (d) to be chosen under item (4) above depends on the control mode in which the program is scanned. It is convenient if a first-in first-out (FIFO) buffer is present having an input connected to an output of the program memory, and a loading input for receiving for each address in the program memory the above-mentioned first control signal. In this way a large quantity of information can be extracted rapidly from the program memory, which can be very advantageous, for example, for common relocation of this quantity to a different memory location. Another application of such a buffer can be that there is still the opportunity to declare invalid a possible provisional detection of an element from the predetermined machine-code set, if it should turn out, for example, to refer to a data character. This could occur if the machine enters somewhere in the middle of such a pseudo instruction. The first-in, first-out buffer can be present as a separate element. It is also possible to include a first-in, first-out buffer in the program memory by means of a begin address (pointer) and a (moving) end address stored in two register positions.

FURTHER DETAILS OF THE INVENTION

Advantageously, the second instruction-decoder mentioned above is provided with a first signal output for indicating a word read out from the program memory as an address data, under control of a first specific machine code belonging to the above-mentioned predetermined machine code set in cooperation with the above-mentioned first control signal. In this way, in an editor mode of the program, all detected addresses can be updated, e.g. modified by fixed address distance, if a part of a program is displaced over this same address distance in a relocation operation.

Advantageously, the second instruction decoder mentioned above is provided with a second signal output for identifying word read/out from the program memory as a piece of data, under the control of a second specific machine-code belonging to the above-mentioned pre-determined machine-code set, in cooperation with the above-mentioned first control signal. In a list operation the data are then not decoded as an instruction but displayed as data; also they are not subjected to the above-mentioned address updating.

Advantageously, the second instruction decoder mentioned above is provided with a third signal output for identifying a word read out from the program memory as text data, under control of a third specific machine code belonging to the above-mentioned pre-determined machine-code set, in cooperation with the above-mentioned first control signal. In the above-mentioned display operation the text information is again not decoded as an instruction nor updated as an address. Text can advantageously be displayed as alpha-numeric characters and data information can be better displayed as hexa-decimal characters.

Advantageously, the second instruction decoder mentioned above is also provided with a fourth signal output for identifying a word read from the program memory as a title, under control of a fourth specific machine code belonging to the above-mentioned pre-determined machine-code set, in cooperation with the above-mentioned first control signal. In this way the appearance of a title can easily be detected each time, so that (for example) a contents list of a program memory can be displayed or a title used as commentary.

Advantageously, the above-mentioned de-activating signal works as a first stop signal for the address register mentioned and the keyboard referred to is provided with means (for example spacing bar) to deactivate the first stop signal by means of a second control signal. In this way each time a subsequent quantity of data (ordinary machine instruction or pseudo machine instruction) can be called up, for example for display on a cathode-ray tube, after which the programmer has sufficient time to consider a possibly complicated decision (such as a modification or a relocation). In a simple case each (pseudo) instruction can, for example, be displayed on a fresh line; in a more complicated case (but only for the display) each machine instruction is translated back into the corresponding source instruction.

Advantageously, the keyboard referred to is provided with fifth means to hold the above-mentioned first stop signal continuously inoperative by means of a third control signal and that means for comparing addresses are present to terminate the above-mentioned third control signal and to generate a second stop signal for the address register, when the address registers reach an end address. In this way a section of the program can be processed, for example, displayed as described above. Another mode of operation is that, for a relocation of the program part, all addresses are updated.

BRIEF DESCRIPTION OF FIGURES

The invention will be further explained below with reference to a number of figures. The invention will more particularly be discussed with reference to a known microprocessor and a development system available for this microprocessor. Finally a number of advantageous modes of operation of a computer system extended according to the invention will be explained.

FIG. 5 shows an example of a program to be used in a computer system and modified according to an application method of the invention.

FIG. 6 gives a second representation of this program.

DETAILED DESCRIPTION OF THE INVENTION

Figure 1:
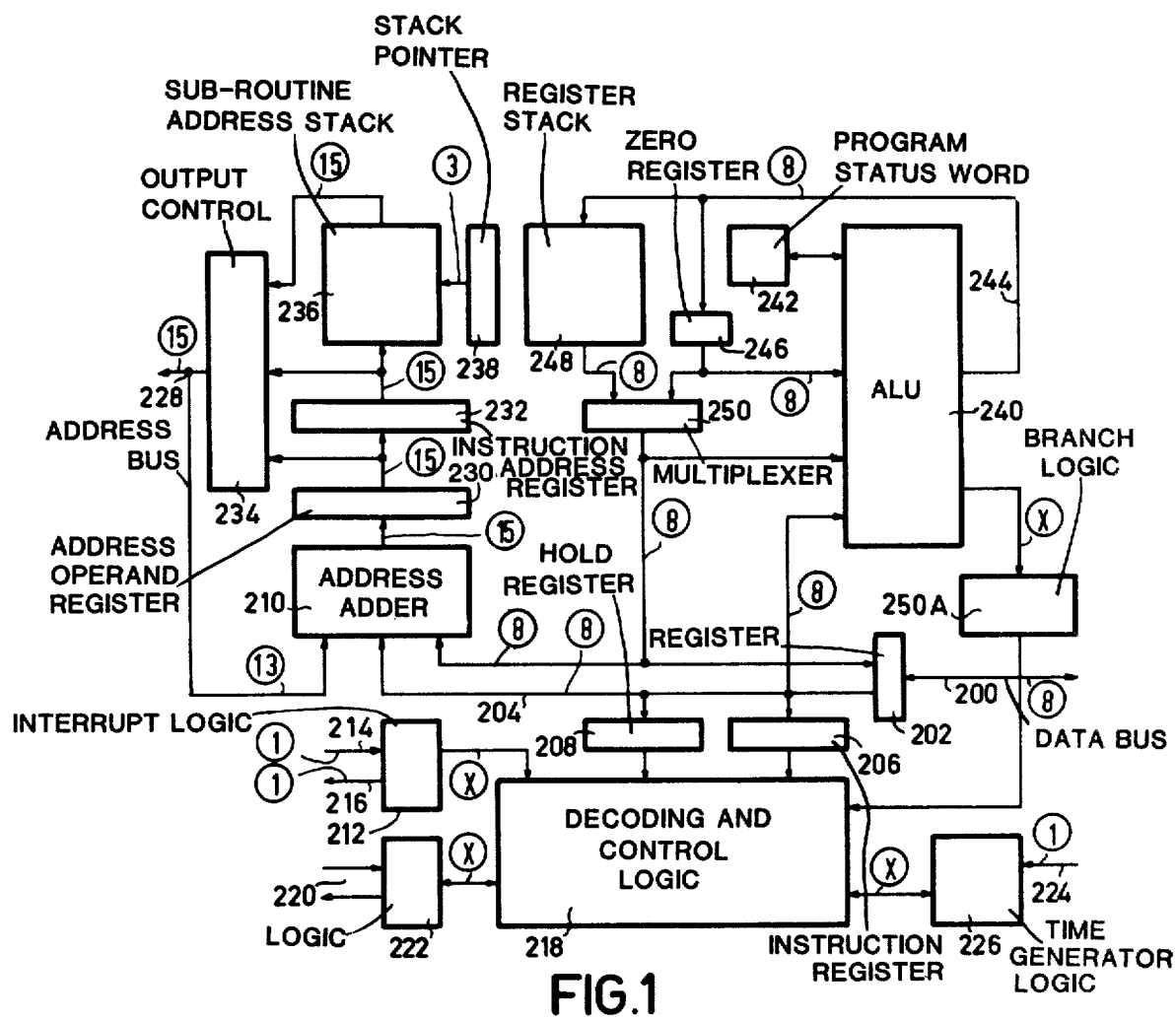
FIG. 1 shows a block-diagram of a known microprocessor.

The invention can be applied to a computer system of arbitrary size. For simplicity, the invention will be described in relation to a microprocessor system. FIG. 1 shows a block diagram of a known microprocessor, viz. the Signetics 2650 bipolar microprocessor, as is shown in FIG. 1 of the book of that name published by the manufacturer Signetics Corporation, 811 East Arques Ave., Sunnyvale, Calif. 1975. The purpose of this figure is to create a framework for understanding the description which follows of the realization of the invention in relation to this microprocessor. The 8-bit data paths and the 13-bit and 15-bit address paths are identified in the circuit. The connections marked "1" and "x" form part of the control bus. For simplicity the other lines of this control bus are not shown here. Connection 200 is an 8-bit bi-directional data bus connected to register 202. The incoming line 204 is connected to the 8-bit instruction register 206, the 8-bit hold register 208 and an 8-bit input to the address adder 210. The latter works over a width of 13 bits. An interrupt-request signal can appear on line 214 and line 216 is reserved for an interrupt-acknowledge signal. Furthermore, the microprocessor has a connection, not shown here, for accepting pause signal that can halt the microprocessor at the end of the current instruction. It can arrest the processing of data for an indefinite time and is used for realizing a direct memory access (DMA) operation. Block 212 contains the interrupt-logic relevant to lines 214 and 216. This block can also send a signal to the decoding and control logic in block 218. Lines 220 are the input and output control lines. The signals on these lines work together with the logic of 222 and with block 218. Line 224 is an external clock-pulse line. This clock pulse is processed in the time-generator logic 226 into secondary clock pulses for block 218. The outgoing control lines from block 218 to the other elements of the circuit are not shown. A second 13-bit wide input to the address adder 210 is connected to the address bus 228, the external connection of which is suitable only to transmit signals. The output of the address adder 210 is connected to the 15-bit address operand register 230; this thus gives the address where an operand or data information are stored. The output of register 230 is connected to the instruction address register 232 and also to the output control element 234; the address where an instruction is stored can thus be signalled. The output of register 232 is connected to the output control element 234 and normally the operand address also goes there. Only in the case of a branch to a sub-routine does the current address go to the sub-routine address stack 236. By means of a return signal an address can be recalled from element 236. The stack has a capacity of 8 words of 15 bits. The address selection for these words makes use of the stack pointer 238. The incoming line 204 is furthermore connected to a data connection of the arithmetic and logic unit (ALU) 240 whch can carry out a plurality of 8-bit wide operations. The operation is controlled by signals from element 218, together with the contents of the program status word 242 which has a capacity of $2 \times 8$ bits. An 8-bit wide result of the operation in element 240 can be fed via line 244 to a register stack which contains the so-called zero-register ($R_o$) 246 and a selectable half of the further stack 248 which contains $2 \times 3$ registers. Which half is selected depends on the bit RS from the program status word; further selection is done by signals from unit 218. The output of the zero-register 246 is connected to the ALU-unit and to the multiplexer 250. The output of the further stack 248 is also connected to the multiplexer 250. The output of the multiplexer is also connected to the ALU unit (240), to the address counter 210 (in order to be able to act as relative address or index datum) and to the register 202 which is connected to the data bus 200. Finally the block 250A contains the logic for the condition code and for possible branches. This block is connected to the ALU-unit 240 and under certain conditions can send a control signal to the control/decoding logic 218. For the functions that can be realized with this microprocessor and for further technical details, reference is made to the manufacturer's book cited earlier. This microprocessor is mounted in a DIP module with 40 soldering lugs.

Figure 2:
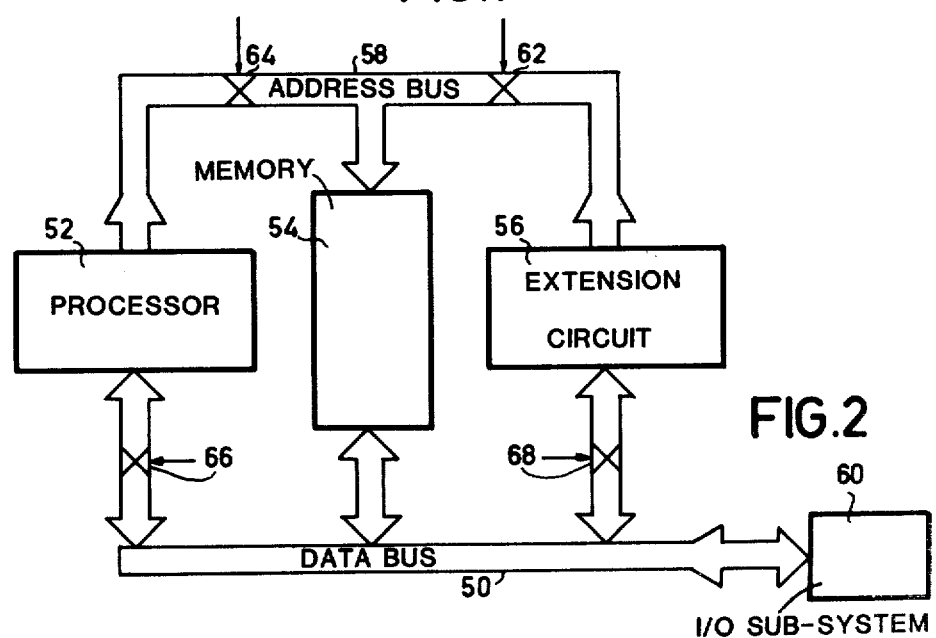
FIG. 2 shows a computer system extended according to the invention.

FIG. 2 shows a computer system extended according to the invention. The system contains a processor 52, a memory 54, and an I/O sub-system 60. The latter may contain a keyboard, a printer and a CRT display. The memory 54 contains the program to control the processor 52 so that this can carry out various operations. It may be a separate module but in certain cases it may be incorporated on the same semiconductor substrate. Or, the processor 52 may be a Signetics "2650" microprocessor. These elements may be connected via a bi-directional data line 50 and via the uni-directional address bus 58. When switches 64 and 66 are open and switches 62 and 68 closed, the system is a conventional microprocessor system and will not be further described. An extra element 56 is present that can communicate with the memory 54 and with the I/O sub-system 60 when the switches 62 and 68 are open. Details of how this is done will be given below. With this system it is possible to address the memory 54, to read out and receive instructions and other data from the memory, therein not to carry out the instructions as the processor 52 would do, whereby branching operations controlled by the instructions themselves would be carried out, but, on the contrary, to process the instructions in the same order as they are stored in the memory 54 and in any case not to execute them. In particular, no branch or jump operations are carried out. The nature of the processing that is then carried out will be discussed further. After this processing, the instructions can be returned to memory 54 or sent further on to I/O subsystem 60. The control of switches 62 through 68 is effected by signals from the keyboard that is incorporated in subsystem 60 notably, only one pair of switches of the two pairs 64/66 and 62/68 open.

Figure 3:
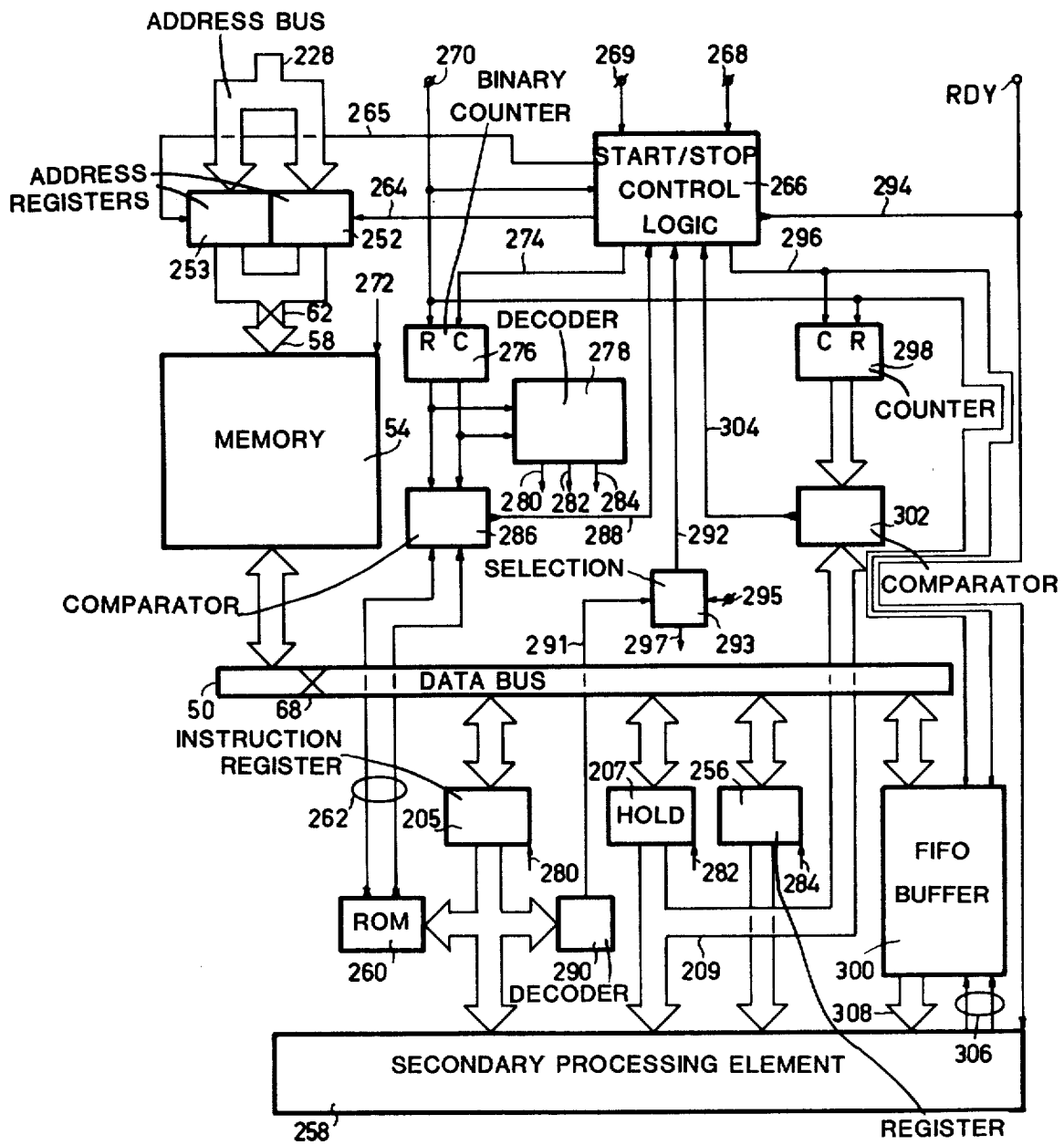
FIG. 3 shows further details of the above-mentioned extension.

FIG. 3 shows the extension circuit 56 of FIG. 2. This circuit exhibits an organization partially similar to that of the microprocessor of FIG. 1; we refer therefore to the manufacturer's literature cited earlier. FIG. 3 shows the data line 50, the switch 68 and the registers 205 (corresponding to 206) and 207 (corresponding to 208). Register 205 always receives the first byte (8 bits) of an instruction which in this case contains the operation code (op.code). The hold register 207 is used for the temporary storage of further instruction information and partial absolute addresses in the event of multiple byte instructions (i.e. instructions of more than 8 bits). In contrast to the situation in FIG. 1 the registers 205, 207 and also 256 (see below) are here all connected for bi-directional traffic to the data bus line 50. FIG. 3 also shows the address line 228 via which the address registers (252 and 253) for the memory 54 can be loaded (one for reading and one for writing). The actual addressing takes place again via switch 62 and address bus line 58. The memory 54 has a word length of 8 bits and an address capacity of up to 15 bits. It can contain the program of microprocessor 52 in object code, whereby each word location has a capacity of 2 hexa-decimal characters. The address on line 228 can be formed in a suitable way, for example, manually via the keyboard of the I/O sub-system or read-out of a register of memory location; this can be organized in the same way as the elements 230 through 236 in FIG. 1. The essentially conventional connections for the loading of registers 252, 253 are, for simplicity, not shown. The address register 252 can be incremented by a pulse on line 264; similarly, address register 253 can be incremented by a pulse on line 265. Corresponding connections are present to decrement these registers by means of decremental pulses. A read-write control signal and an enable signal for memory 54 appear on a possibly multiple line 272. The circuit of FIG. 3 also possesses a third register 256 which is also connected to data line 204. This register may be a virtual or non-dedicated register when it is constituted by storage elements contained 258, in which the further processing takes place, as will be discussed below. This further processing can be done by switching elements that are substantially of a similar nature to the data processing elements in FIG. 1, for example an address adder (210), decoding and control logic (218), and the control bus for control signals which, for brevity is not shown in FIG. 1. A part of the control logic is further shown in FIG. 3. In fact the element 56 need only be a somewhat modified microprocessor of the same type as 52, for example a Signetics "2650" to which various extensions have been added, to be described, and in which other functions are not implemented because the actual program may not be executed and particularly no branching operations need to be carried out (these can of course be carried out in element 52). In element 56 the program memory 54 is scanned in sequence of addresses, whereby the begin and end addresses are always fed in from outside, viz. from the keyboard in the I/O sub-system 60. In another version one single element can take the place of the elements 52 and 56, whereby certain parts of that replacement element are put out of action, depending on the control mode (see later). The elements already present in the arrangement of FIG. 1 will now be described, but first the readout of memory 54 will be described.

Element 266 is the start/stop control logic. A clock pulse appears at input 268 every cycle of the program memory 54. This pulse is derived from the primary clock pulse on line 224 of FIG. 1. When processing of the next machine instruction has to begin, a "next" signal appears on terminal 270. Element 266 is then operative to give clock pulses on lines 264 and 274. As stated, the clock pulse acts as an increment signal on line 264. Element 276 is a two-bit binary counter which is reset to zero by the signal on terminal 270. For this counter the signal on line 274 acts as an increment signal. In so far as is necessary in the memory configuration used, this signal is also fed (via a connection not shown) to line 272 as read control signal. Element 278 is a binary to one-out-of-three decoder. When counter 276 goes into the state "1", a "1" pulse appears on output 280. This is fed to register 205 as a load pulse. In a similar way, the states "2" and "3" of counter 276 generate load control pulses for registers 207 and 256 via lines 282 and 284.

Element 260 forms part of the read-only memory (ROM) for the control that gives the length of each instruction. For each instruction (byte in register 206) it indicates: 1,2 or 3 on the 2-bit line 262 just as long as register 205 contains the instruction part in question. Element 286 is a two-bit comparator for the position of the counter 276 and the signal on line 262. The "equal" signal appears on line 288 and if it concerns an instruction known from the instruction set of the Signetics 2650 microprocessor the clock pulse train on lines 264 and 274 is terminated. The signal on line 288 can furthermore be used to start the further operations not shown in block 258: in as far as it is relevant, the instruction in question is available in registers 205, 207 and 256.

In this version, however, the signal on line 288, in cooperation with the absence (see later) of a signal on line 292, gives a "ready" signal on line 294 that can become operational in block 258 or in other parts of the computer system.

To realize the extension to the computer system as envisaged by the invention a number of further elements are present. On the output of register 205 there is a further decoding element 290 present. This element reacts to the machine-code signals C4 (11000100) to C7 (11000111) which up to now have not been defined in the instruction set of the Signetics 2650 microprocessor. These machine-code signals can be designated as (110001xx) where x represents an arbitrary binary digit ("don't care"). The output line 291 is quadruple and each lead is reserved to indicate the detection of a specific one of the four machine-code signals mentioned above. Element 293 is a selection element which, under control of a selection signal on the control input 295, passes one or more of the above-mentioned machine-code detection signals, and presents a signal on line 292. If element 293 is adjusted to detect all four machine codes, the signal on line 292 is equivalent to the OR-function of the multiple signal on line 291. This OR-function is needed for the control of element 266 which controls the read-out cycle. In a similar way, another selection of the above-mentioned four machine codes can be detected on another output 297 of element 293. The four machine codes in question still work as two-byte instructions and hence in addition to register 205, register 207 is also loaded, but not register 256. Furthermore no signal "ready" is now formed on line 294 on receipt of the signal on line 288 (but now there is a signal on line 292) but a new series of clock pulses is formed on line 296, intended for the 8-bit counter 298 and for the 256-bytes first-in first-out buffer (FIFO) 300. This can easily be done by switching over the clock-pulse train appearing earlier on line 274. For counter 298 these pulses function as increment signals and if necessary they are fed as read-write control signals to line 272 via a connection not shown in the figure. Terminal 270 is also connected to the reset input of the 8-bit counter 298 and to the reset input of FIFO buffer 300. The counting pulses on line 296 are also fed to the FIFO buffer 300. The reading of counter 298 is fed to the 8-bit comparator 302. This comparator also receives the contents of register 207. As long as there is inequality each time a following word in the program memory 54 is read out and fed via the 8-bit line 50 to the first-in first-out buffer 300, to be stored there, all this under the activation by the clock pulses on line 296. When equality is detected in element 302, a signal is given on line 304, for example a "1" pulse. Coincidence between this pulse and the signal on line 292, which indicates the machine-code signals C4-C7 mentioned earlier, causes control element 266 to give a "ready" signal on line 294. The information already read-out from the program memory but not yet used is present in the same order in that it was read in the FIFO buffer 300. Lines 306 are suitable for feeding a read pulse to the FIFO buffer, and a reset pulse (whereby all information in the buffer is erased). The information read from buffer 300 goes via lines 308 to the element 258 for further use. The FIFO buffer 300 may be built up according to known techniques; separate building blocks with this function are commercially available. The program memory 54 may be a PROM memory whereby the list mode (to be discussed later) can be effected. It can also be a RAM (random access memory) in which both read and write operations are possible. The addresses for writing are contained in the address register 253 which is loaded in the same way as register 252. The data to be written-in are supplied in a similar way by registers 205, 207 and 256 and by the FIFO buffer 300. For this purpose the connections between these elements and the data line 50 are bidirectional. A read-write control signal can appear on terminal 269 to select the incrementing to address registers 253/254 and also the direction of the information flow in data line 50. A write operation in the program memory 54 is done in substantially the same way as a read operation: first a reset signal appears on terminal 270, after which first the registers 205, 207 are read-out when instructed to do so by the selection signal of element 278 and then the contents of the FIFO buffer 300 are removed successively. Again, when equality is detected in element 302 a stop signal is generated, if only a signal amount of data is transported. The equality can, however, also activate a new read signal for memory 54 at the address indicated by register 252.

The importance of the extension described above is that in a program which may contain inserted addresses, text, data information and titles, the address counter(s) can scan the program in the normal address sequence while there is yet complete certainty that:

(a) the information fed to register 205 is always an instruction code (containing the op-code) either of a hitherto usual instruction, possibly to be executed, or of a pseudo-instruction containing further information;

(b) also, all instruction codes, both the known and the newly-introduced pseudo-instructions, always see their first byte fed to register 205, so that they can be decoded in the proper way.

Figure 4A:
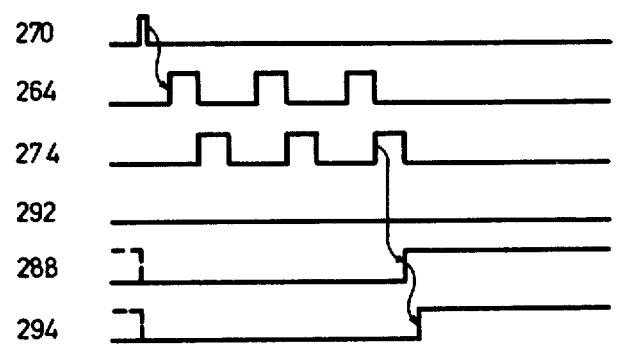
FIGS. 4a, 4b show two sets of pulse waveforms.
Figure 4B:
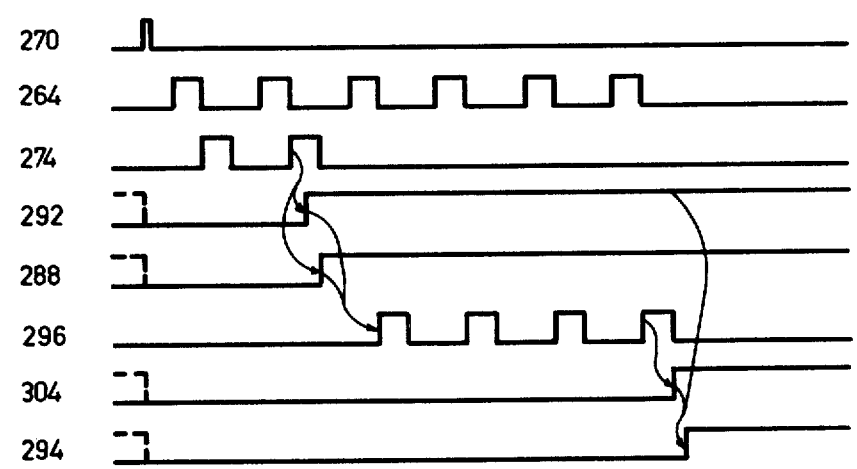

To clarify the read operation in the program memory, pulse waveforms are shown in FIGS. 4a, 4b. FIG. 4a shows the pulse sequence for a normal machine instruction of three bytes. At the beginning, the address register points to the op-code byte of the instruction concerned. When the start pulse has appeared on line 270, lines 264 and 274 each get three clock pulses (mutually displaced in time). After this the "equality" signal appears on line 288 and after a further short delay the "ready" signal comes on line 294. Then the address register points to the op-code byte of the following instruction. The signals on lines 288 and 294 can be terminated for starting a new cycle, not later than the starting pulse on line 270.

FIG. 4b gives the pulse waveforms for a "direct-transmission" machine instruction which thus, after two bytes, gives the "equality" signal on line 288. Just before this, however, the voltage on line 292 has become "high", so that the clock pulses then appear on line 296. It is assumed that after four transmitted bytes, the equality signal appears on line 304. Together with the "high" signal on line 292, this then forms the "ready" signal on line 294. Again, the address register then points to the op-code byte of the following instruction.

Figures 5, 6:
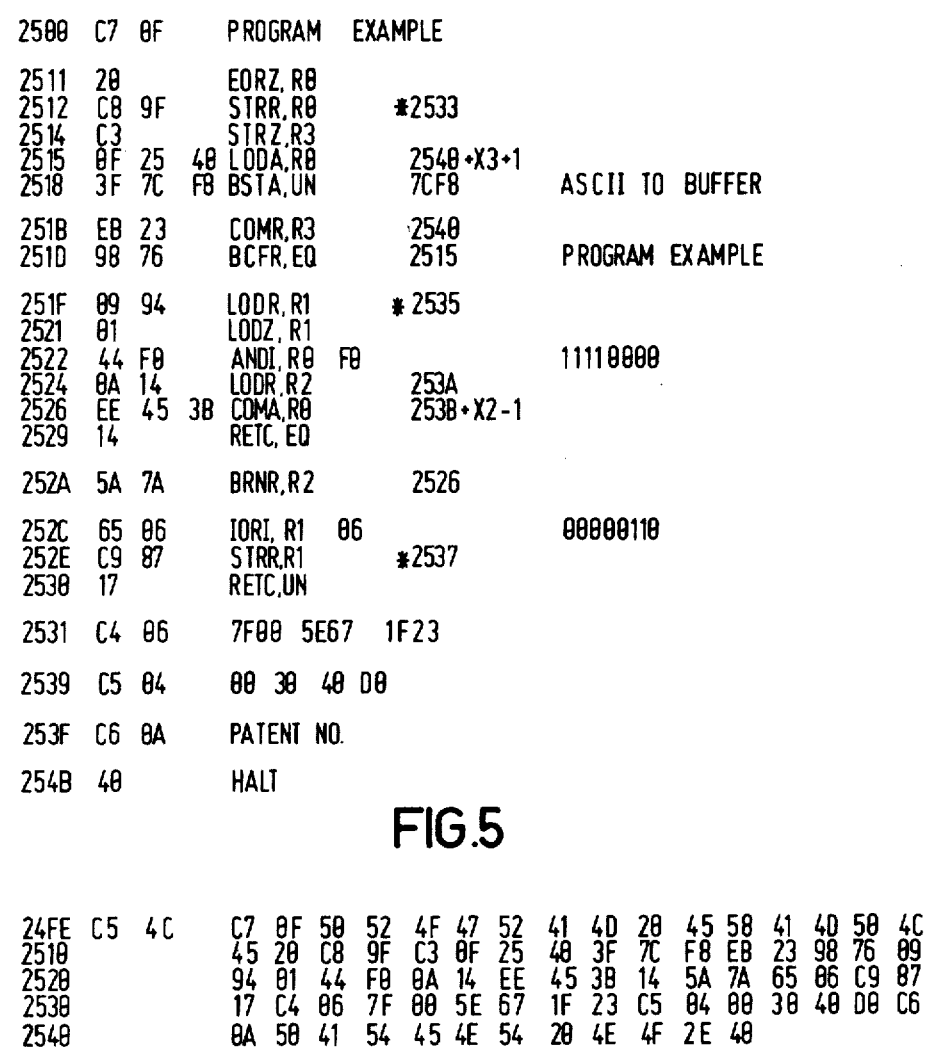

FIG. 5 shows an exemplary program in this case, to be used in a system according to the invention, as it may be printed out or displayed in a given mode of operation ("list"). The first column, starting with 25∅∅, gives the addresses in the program memory in hexa-decimal numbers. The second column starting with C7, gives the op-code of each instructions, each as two hexa-decimal characters, i.e. as an 8-bit byte. The third column, starting with ∅F, and the fourth column, starting with 4∅, give the further data contained in each machine instruction such as e.g. addresses or data. The fifth column, starting with "PROGRAM EXAMPLE" gives either the instruction as a symbolic group of characters or other data such as generated during the interpretation of the instruction. Line 1 contains the "new" op-code C7, line 19 the new op-code C4, line 20 the new op-code C5 and line 21 the new op-code C6. Each time, further information as to title, address, data and text has been printed after the address distance signal (∅F, ∅6, ∅4, ∅A). The significance of the conventional instructions can be found in the book "Signetics Microprocessor 2650" already referred to. The further structure of FIG. 5 is discussed later. FIG. 6 shows the contents of the program memory required for the regeneration of the information in FIG. 5. It is further pointed out here that in FIG. 6 a very large part of the space is taken up by information not forming part of a machine instruction to be executed. The indication C5-4C in FIG. 6 is necessary for the display of the information of that figure.

In the arrangement of FIG. 3 the instruction decoder 290 is triggered by any of the machine codes C4-C7; the signal on line 292 thus indicates that the information 110001XX has been received (the X's represent arbitrary digits). The machine codes indicate the following program content:

C4(11000100): the address-distance byte is followed by a number of bytes (memory locations) which address data, said number being determined by the contents of the address-distance byte, two bytes together forming one address in this version.

C5(11000101): the address-distance byte is followed by a number of bytes of data information, each of 1 byte, the number being determined by the contents of the address-distance byte.

C6(11000110): the address-distance byte is followed by a number of characters, the number being determined by the contents of the address-distance byte, for example text expressed in characters coded in ASCII codes. An ASCII text byte (capital letters and digits) is in fact a restricted set of characters for display purposes recognizable by the fact that their value lies between 2∅ (00100000) and 5F (01011111). Between ∅ (00000000) and 2∅ on the other hand, there are control characters and between 5F and FF (11111111) there are yet other characters not necessary for display purposes and in the form of lower-case letters.

C7(11000111): the address-distance byte is followed by a quantity of character bytes, of length determined by the contents of the address-distance byte, together forming a title. This may be the same ASCII characters as before; the function of a title is, however, different (see later).

MODES OF OPERATION OF THE INVENTION

Here follow descriptions of some problems involved in the design of a program, a known design system, and finally a number of modes of operation of the invention. The program is conceived as a source program, making use of a keyboard having alpha-numeric keys and function keys such as "carriage return" and "space". The program contains source instructions which consist of a symbolizing group of characters (instruction mneomonics) and further data such as a call address or the value of a parameter. The source program also contains explanatory text, titles (e.g. of sub-routines), addresses and data information (not all categories always being present). When displayed, the source program is easy to assess and thus, in certain respects, corrections are easy to carry out. The source program is translated by an assembler which is built up round a read only memory. The machine program thus created can be tested. It can be intended for the control of a technical device such as e.g. a digital measuring instrument, an industrial machine or an apparatus for processing financial data such as those containing a microprocessor. A development system for such programs is, for example, the Signetics "TWIN" system described in the book "Operations Guide" published by Signetics Corporation, 811 East Arques Ave., Sunnyvale, Calif. 1976, document No. TW 09003000 and the related works "TWIN" System Reference Manual (no. TW 09004000) which describes the physical structure of the computer system and "2650 Twin Assembly Language Manual" (No. 09005000) which describes the structure and use of the assembler system. The editing of the program and, more specifically, the solution of the problem of the "non-recognizable" non-instruction parts of the machine program is done here with a double Signetics 2650 microprocessor. Of these two, one executes the machine program proper, while the other controls the first microprocessor. This is done by a so-called "trace" method in which each machine instruction points to a subsequent machine instruction (in the absence of special measures, the instruction that is stored in the next memory address). In this way a "non-instruction" part of the machine program is never reached because the beginning thereof is always directly preceded by a "branch" instruction. Using this trace method, every machine instruction is translated back into the corresponding source instruction by means of a disassembler. When a branch instruction is met, this specifies the branching address and the branching is also executed. Application of this trace method gives the user a picture of how a program works but it gives no idea of the way in which the program (instructions and further data) is stored in the memory. The organization of the storage of the program can be uncovered in the known system only with the aid of the source program for which, as mentioned earlier, a much larger memory capacity is necessary. However, to practice the invention the source program need not be resident in the embodying computer system. Furthermore, the introduction of the extensions according to the invention makes possible a number of modes of operation which make the program manageable in yet another way than what would be possible using the source program.

Figure 7A:
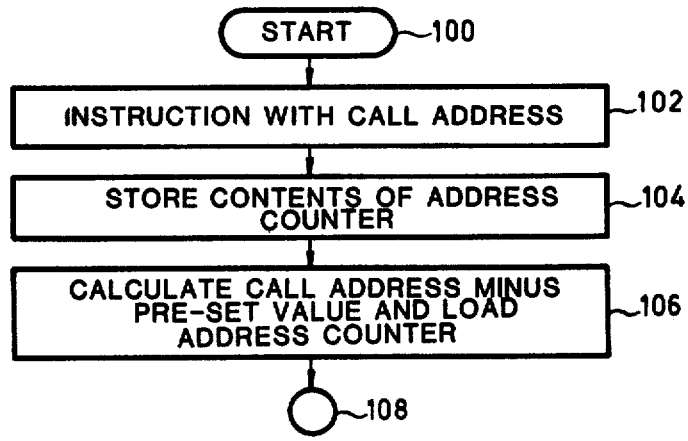
FIGS. 7a, 7b give flow charts showing a mode of operation for the identification of the called-up addresses.
Figure 7B:
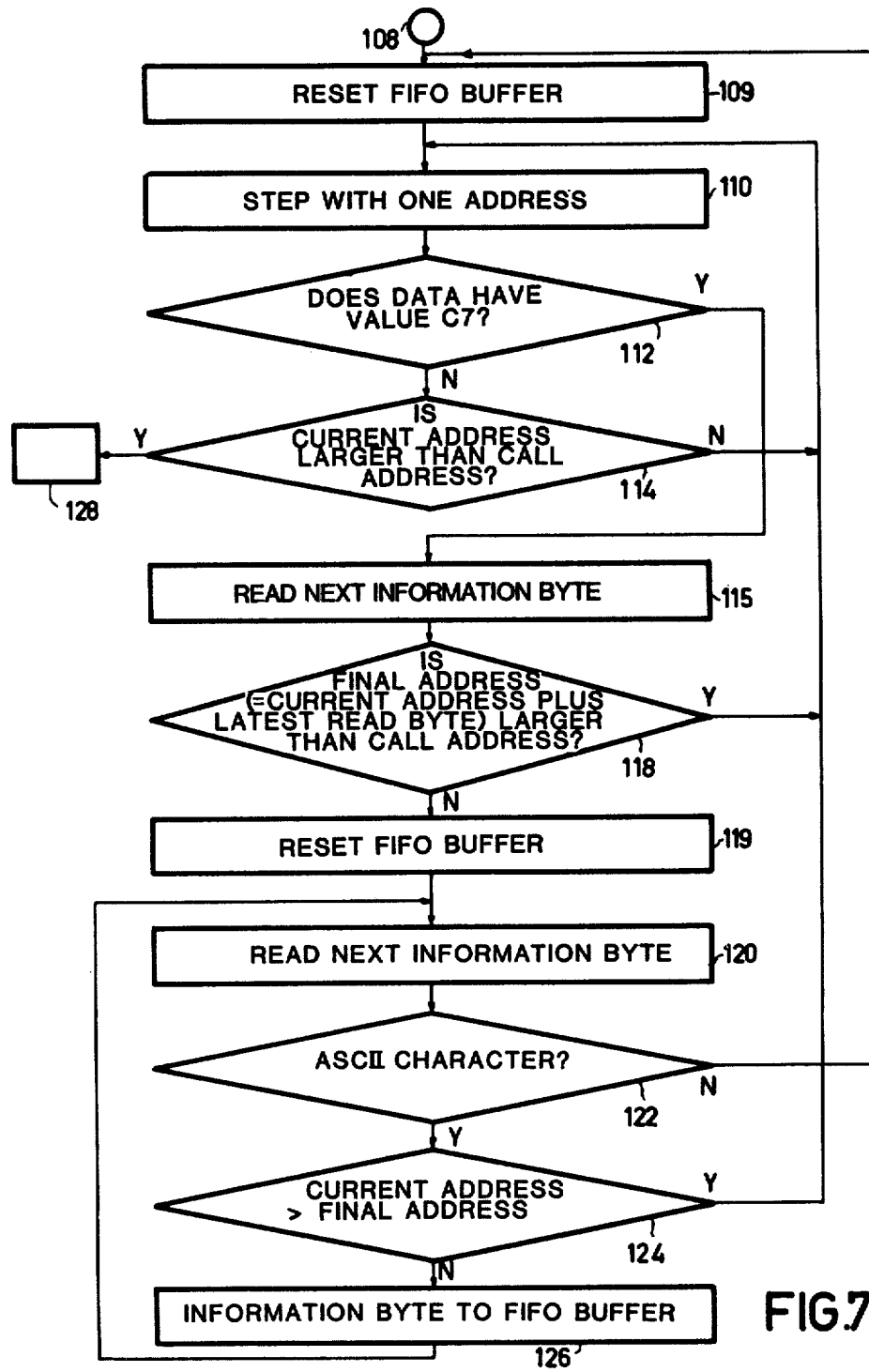

FIGS. 7a, 7b are flow charts for a mode of operation in which called addresses are identified. The following questions are answered: is this machine-instruction calling up a sub-routine and, if so, which one? The calling instruction is present in the registers 205 and 207, and possibly in 256 of the circuit shown in FIG. 3. In the circuit of FIG. 1, these may be the corresponding registers 206, 208 and 202. It is assumed that the computer has halted. There are two possibilities for a call address. It may be an absolute address filling the last two bytes of a 3-byte instruction. It may also be relative address filling the last byte of the 2-byte instruction. If it is a relative address, the computer first reconstructs the absolute call address in known manner with address adder 210 or an equivalent element not given in the circuit of FIG. 3. The FIGS. 7a and 7b show flow charts of the necessary sub-routine which is called thereupon, the respective elements of these operations being in common use.

Quite generally, and together with the fact that each title in the machine program is preceded by the machine code C7 plus an address-distance byte, this sub-routine offers a convenient aid for the recovery of the title related to the program address called. It is now assumed that titles have a limited length, for example not more than 20 characters. It is further assumed that when a sub-routine with a title is called (thus not, e.g., an address of the (sub) routine in execution up to that moment, or a data character), that the address called is always one of the first of the addresses (e.g. in the first ten) following the end of the sub-routine title. The restriction to ten is purely pragmatic. After the "start" in block 100 (FIG. 7a), detection takes place in block 102 only when an "instruction with call-address" is involved. If this is not so, an increment is made to the following instruction. If necessary, the absolute call address is then calculated in block 106, and then reduced by a fixed pre-set amount; in the above-mentioned case this is, for example, at least (20+10)=30 addresses. The resulting address is written into the address register which is incremented in the same way as the address register 252 in FIG. 1. Physically this may be the same register whereby the old address is saved. Next, in FIG. 7b the FIFO buffer 300 is reset to zero, so that "old" information is no longer relevant (block 109). Then in block 110 a succession of increments by one is executed, while in element 293 in FIG. 3 the selection takes place exclusively on op-code "C7". This is done because it cannot be known a priori where the relevent pseudo code C7, which indicates the beginning of the title, is stored (block 112). In block 114 it is detected whether the current address is larger than the call address (the initial starting point). If it is larger, the subroutine is left via block 128. If code C7 is met, the distance information is read into register 207 in block 115. In block 118 the sum of current address plus the value of the address-distance byte is compared with the call address. If the latter is lower, the "C7" code is probably a data code from a previous part of the program; the machine then goes back to block 110. Otherwise in block 119 the FIFO buffer is reset to zero. In principle, it can happen that two titles are met: only the second of these two (or possibly three) is then relevant. Next in block 122 a check is made as to whether it is an ASCII character. If this is not so, an error has occurred somewhere, for example because the "C7" code represented to a data character; in that case the buffer, too, is reset, so that when the sub-routine is left there is never irrelevant information present in the buffer. If an ASCII character for display was involved, a check is made in block 124 to see whether the end address has been reached. If the "equality" signal has not yet appeared on line 304 in block 126 the character in question is stored in the FIFO buffer. When block 128 "ready" has been reached the contents of the FIFO buffer are fed to an alpha-numeric character generator and thence to the cathode-ray tube display system or to the printer. In the foregoing, a more rapid passage can be effected if it is known with certainty that at most a single title is present: the "yes" output of block 124 is then also connected to block 128 and block 119 can then be omitted.

Figure 8:
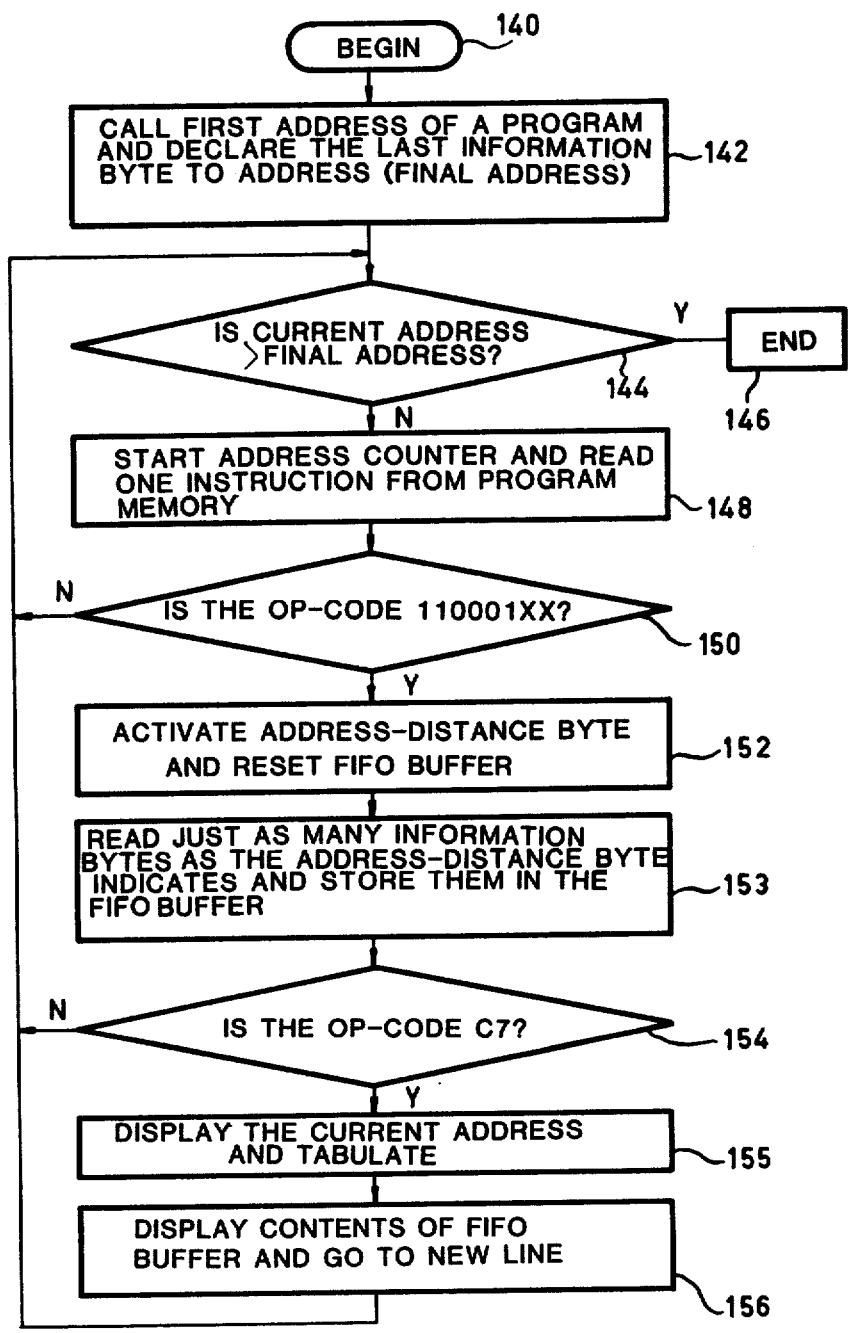
FIG. 8 gives a flow chart of an operating mode for the display of part of a program in order or addresses.

FIG. 8 shows a flow chart of a mode of operation for displaying a part of a program in sequence of the addresses and, in particular, for making a list of contents of the sub-routines (title and starting address) in the program. After the start in block 140, in block 142 the first address of a program is called and the current address is made equal to this. In addition, the last address is declared that is the address of the op-code byte coming directly after the last instruction. In block 144 a check is made as to whether the latter address is still larger than the current address. If this is not so, block 146 (END) is reached. Next in block 148 the address counter is started (terminal 270 in FIG. 3) and a whole instruction of 1, 2 or 3 bytes is read out. In block 150 a check is made as to whether one of the four op-codes C4-C7 is involved. If this is not so, block 144 is again reached. If a "pseudo" op-code is indeed involved, in block 152 the FIFO buffer is reset to zero and the address-distance byte of register 207 is activated. Next, in block 153 as many information bytes as are indicated by the address-distance byte are read out from the program memory and stored in the FIFO buffer. Then there is a check in block 154 as to whether the op-code C7 is involved. If this is the case, in block 156 the current address (the first address after the title, of which the information is stored in the FIFO buffer) is displayed and tabulated. After this in block 156 the contents of the FIFO buffer are displayed and the display device goes to a new line. When block 146 has been reached, all sub-routines with their starting address have been displayed (e.g. on a printer). If a display screen is involved with a limited number of lines, a passed signal such as discussed for the microprocessor 2650 may be implied at the output of block 156. This may be cancelled manually, for example by pressing the space-bar on the keyboard. A further mode of operation to display a maximum of some predetermined number of lines of the display screen in one go, is for brevity not discussed here.

Figure 9B:
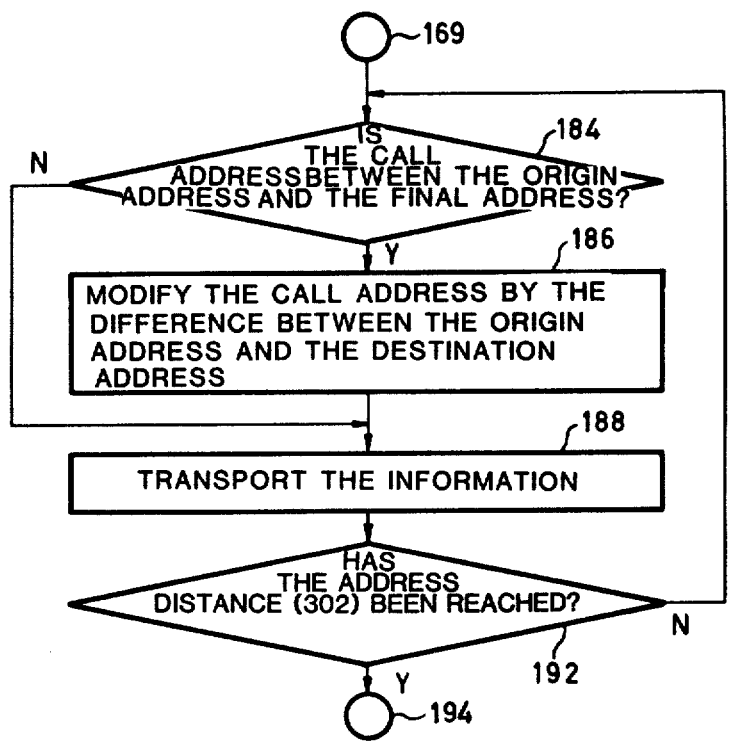
FIGS. 9a, 9b, 9c show flow charts of an operating moe for the processing in a pre-determined displacement distance of the addresses occurring in a part of a program.
Figure 9A:
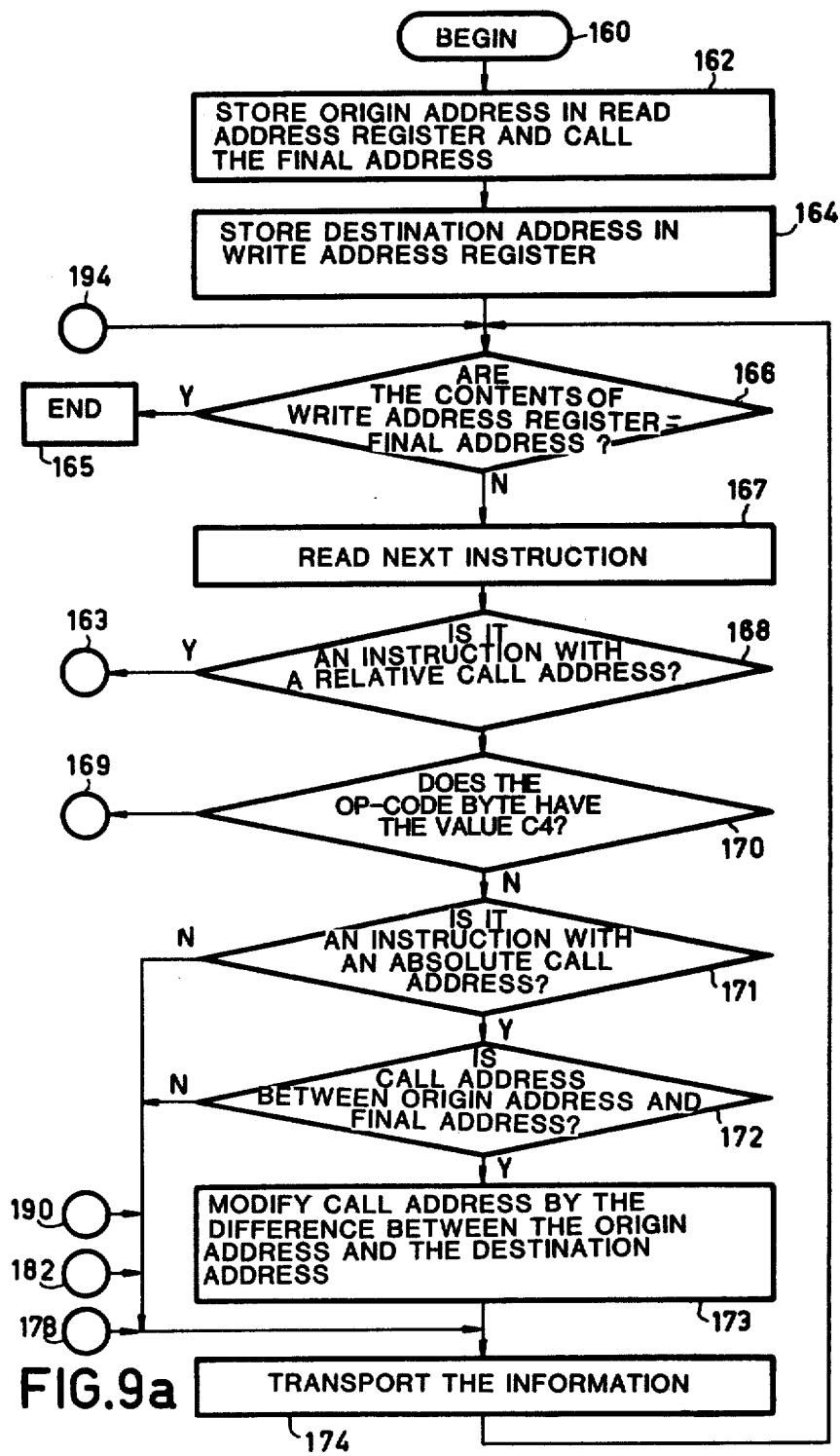
Figure 9C:
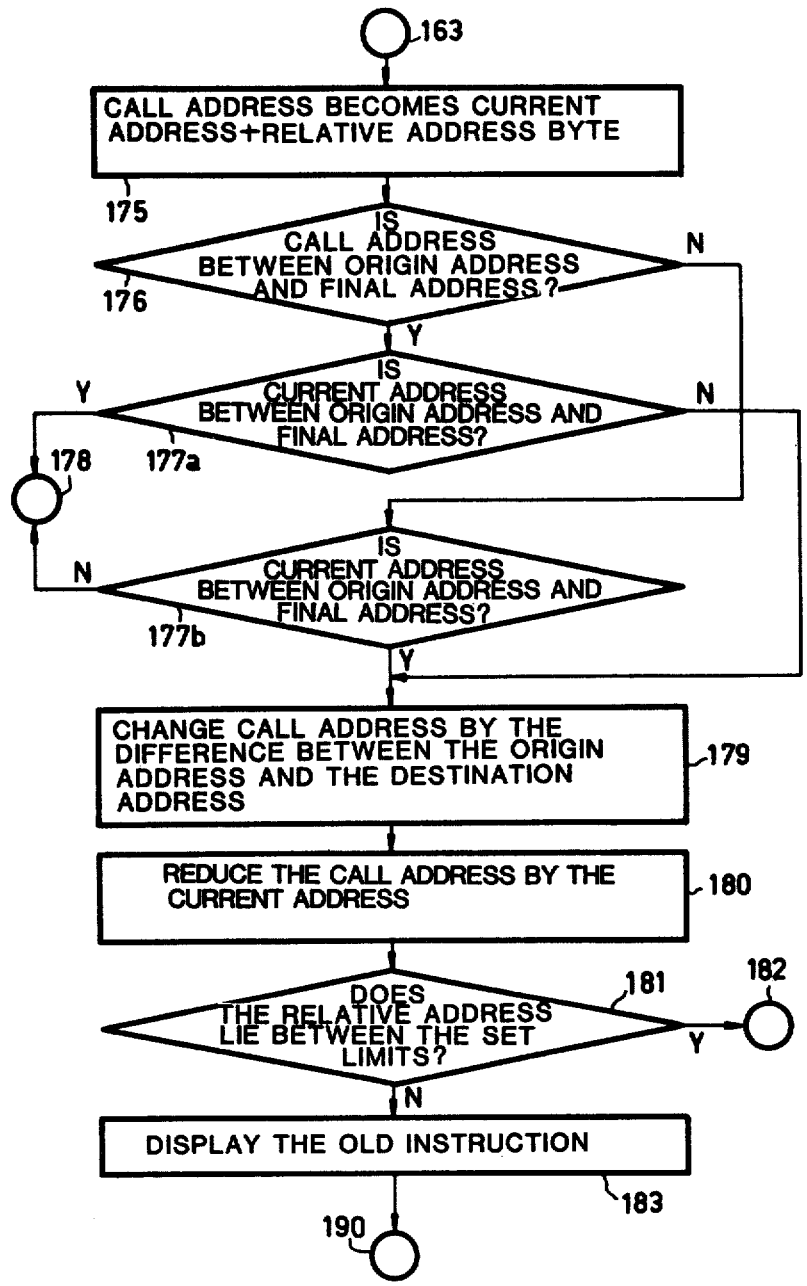

FIGS. 9*a*, 9*b*, 9*c* show flow charts for a procedure for the updating of the addresses occurring over a predetermined displacement distance in a part of a program and with them to shift the part of the program in question over that same displacement distance. It is assumed that there is no objection against this relocation either on technological grounds (the destination is a read-write memory) or on grounds of organization (the memory location at which the relocation takes place is empty). A few modifications for specific cases will be discussed below.

After the start in block 160 in block 162 the origin address (the part of the program begins there) is stored in the read address register (252 in FIG. 3) and the end address of the part of the program is recovered for later comparison. In block 164 the destination address (the part of the memory where the part of the program will be stored begins there) is then stored in the write address register (253 in FIG. 3). In block 166 a check is made as to whether the contents of the write address register (thus not the current address) are equal to the end address. In block 167 the next instruction of 1, 2 or 3 bytes is read out. In block 168 there is a check as to whether an instruction with a relative call address is involved. This is a 2-byte instruction. If this is so FIG. 9*a* is left via block 163. In block 170 there is a check to see if the op-code byte has the value C4. If so FIG. 9*a* is left via block 169. In block 171 a check is made as to whether an instruction with an absolute call address is involved. In block 172 a check is made as to whether that call address lies between the origin address and the end address. Only if that is so is the call address in block 173 modified by the difference between the address of origin and the final address. This difference may be positive or negative. Next in block 174 the instruction is transported without further modification to the destination address and the system goes back to block 166. Block 174 can also be reached from block 171 (it is an instruction without an address) or from block 172 (the address indicates a memory location outside the part of the program to be transported). Transportation of a "pseudo" instruction with the op-code C5, C6 or C7 may take a number of cycles, in the same way as discussed for a "C4" instruction in FIG. 9*b*, but these pseudo instructions are transported unchanged to their destination addresses. Finally the sub-routine of FIGS. 9*a–c* is left via block 165. For brevity this is not given here (block 188, 192 in FIG. 9*b*).

FIG. 9*b* is reached via block 169. In block 184 it is checked whether the address in question lies between the origin address and the end address (cf. 172). In block 186 the call address is up-dated (cf. block 173). In block 188 the information is transported (two-byte information). In block 192 a check is made as to whether the address-distance (element 302) has been reached. As long as this is not seo, the cycle of FIG. 9*b* is repeated. Finally the exit takes place via block 194 and block 166 is reached once more. The sub-routine of FIG. 9*b* can also be implemented by first storing the whole contents of the pseudo instruction with the op-code C4 in the FIFO buffer and to update sequentially the addresses that thus become available and then to store them again in the FIFO buffer. When the whole series of addresses has been updated, they are then available at the output of the FIFO buffer in the correct sequence. When they are again available after up-dating, the data in the FIFO buffer are transported to the destination address because then block 174 is passed.

FIG. 9c is reached via block 163. In block 175 the call address is determined as the sum of the current address and the instruction byte containing the relative address data. In block 176 a check takes place as to whether the call address lies between the origin address and the end address. It is now assumed, as extension, that only a part of the program is displaced. It can then happen that also certain addresses outside that part of the program have to be up-dated. For this reason a check is made in both blocks 177a and 177b as to whether the current address lies between the origin address and the end address. If both addresses (calculated address and current address) lie within the part of the program to be transported or both lie outside it, a relative address does not need to be modified and block 174 in FIG. 9a is reached via block 178. If one of the addresses lies within the part of the program to be transported and the other lies outside, then block 179 is reached. Here the call address is changed by the difference between origin address and destination address (block 173 in FIG. 9a). Then in block 180 the (absolute) call address is reduced by the current address. A check is made in block 181 as to whether the resultant relative address lies between the relevant limits. For an 8-bit byte these limits may lie at ±63 (this byte contains six address bits, one character bit and a so-called indirection bit) whereby −64 is also permissible (see the book on the "2650" microprocessor referred to earlier). If the relevant limits are not exceeded, via block 182 FIG. 9a is again reached (block 174). If these limits are exceeded in block 183, the instruction is displayed in its original form, i.e. with the reference of the relevant current address and the original relative address. The programmer can then intervene later for the displayed information represents an error indication. One possibility for correction is that the instruction with relative call address is changed into an instruction with absolute call address, for which one extra address byte is necessary. The whole transported part then has to be modified by the programmer. After block 183 the unchanged instruction is thus again available and the diagram of FIG. 9a is reached once more, via block 190.

The foregoing also works if there is an overlap between the original part of the program and the displaced part, provided the transfer is effected in the direction of lower addresses. If it is necessary to transfer in the direction of higher addresses, the process takes place in two stages: first the addresses are updated and only when the whole program has been updated is it transferred, beginning at the high addresses decrementing pulses being fed to the address counters. In the same way as described above a whole program can also be transferred from a PROM to a RAM, to become operative there.

Figure 10A:
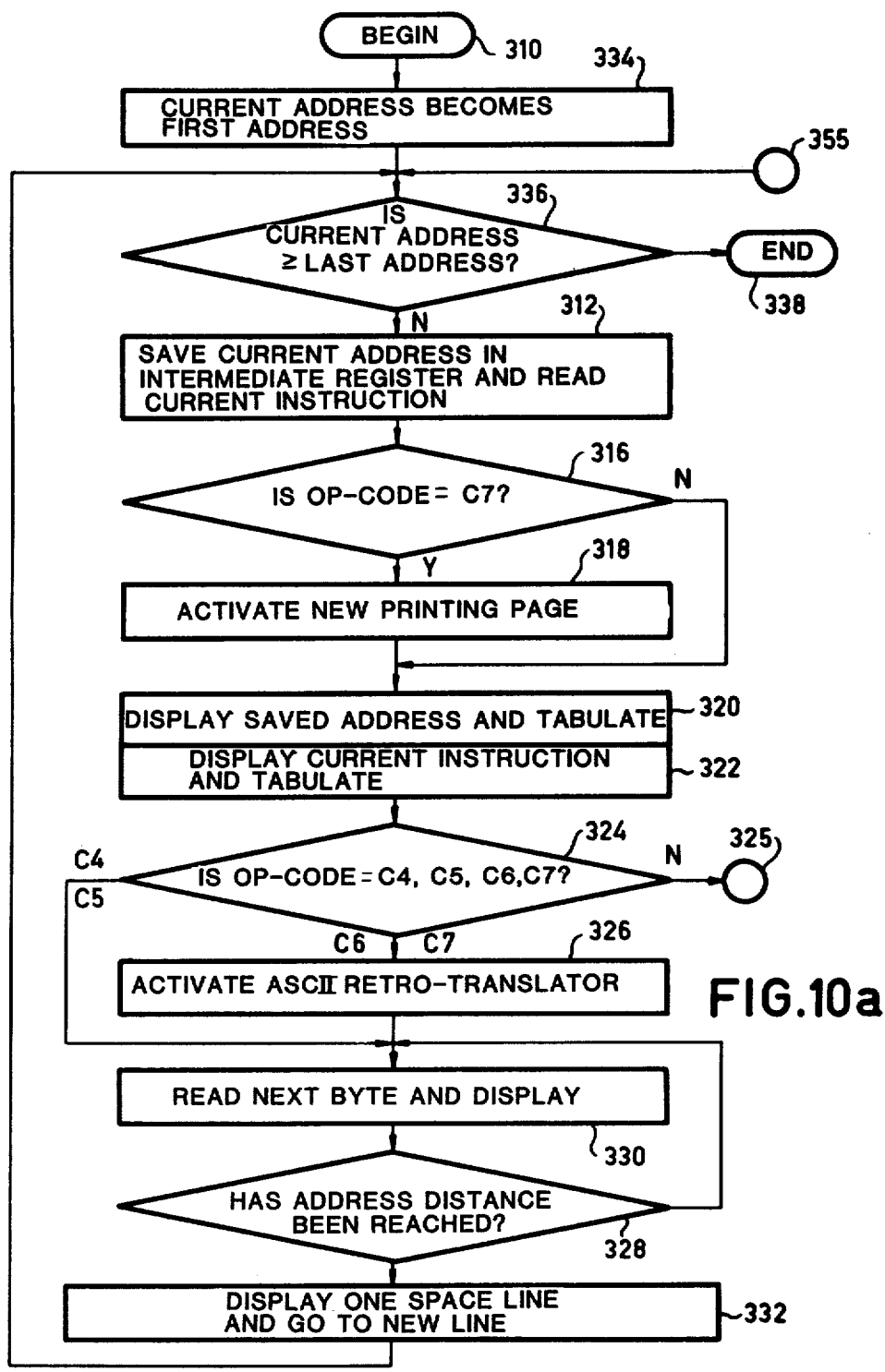
FIGS. 10a, 10b show flow charts of an operating mode for the display of a section of the program.
Figure 10B:
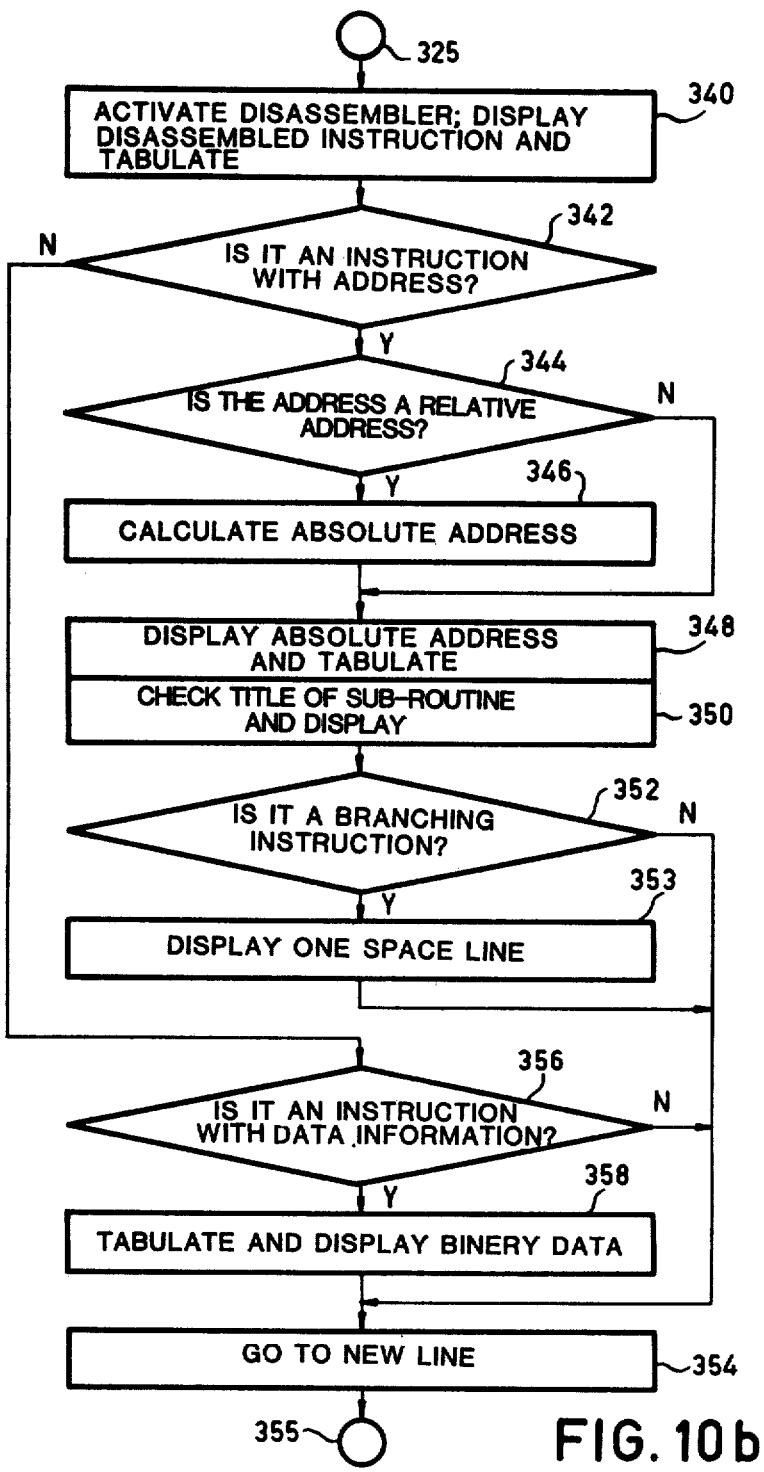

FIGS. 10a and 10b show flow charts of a mode of operation for the display of a section of a machine program. From the exemplary machine program, that is given in FIG. 6, a display is obtained that is much clearer to the programmer as shown in the corresponding example of FIG. 5. After the start in block 310 (FIG. 10a), where also the first and last addresses of the section to be displayed are declared, in block 334 the current address is made equal to the first address. In block 336 a check is made as to whether the current address is at least as high as the last address. If this is so the sub-routine is left via block 338: end. If not, in block 312 the current read address of the program memory is stored in an intermediate register and, moreover, the instruction of 1, 2 or 3 bytes beginning with the current address is read-out from the program memory and stored in further intermediate register spaced (for example, the registers 205, 207, 256). In block 316 a check is made as to whether the op-code has the value C7. If so, a new printing of the page is activated in block 318 (it is here assumed that the display device is a printer). Next, in block 320 the op-code address stored most recently in the above-mentioned intermediate register is read out, displayed and thereafter, a tabulation is effected. Then in block 322 the instruction read-out earlier from the further intermediate register space is displayed (in machine code), followed again by a tabulation. In block 324 a check is made as to whether the op-code has either the value C4, C5 (1100010x) or the value C6, C7 (1100011x) or finally, a value different from (110001xx). In the case of C6, C7 (text or titles) in block 330 an ASCII translator is activated. In the case of C4-C7, in block 326 the next byte from the program memory is read and displayed. In the case of C4, a byte is transformed into two hexadecimal characters, while each second, fourth, etc. byte is followed by a space. In the case of C5 a byte is transformed into two hexadecimal characters, while each byte is followed by a space. In the cases of C6 and C7, each byte is transformed into an alpha-numeric character, whereby space characters also should have been stored in the program memory. Next in block 328 a check is made as to whether the address distance has been reached (cf., for example, block 118 in FIG. 7b). If this is not so, the next following byte from the program memory is processed in block 330. When the address distance is reached in block 332 one-line space is printed and the printer shifts on to the beginning of the next new line and thence to block 336.

If block 324 is concerned with a code other than (110001xx), then in block 340 a disassembler is activated for the machine instruction; the instruction is disassembled into source code and displayed. A tabulation follows. In block 342 a check is made as to whether an instruction with an address is involved. This check is done by way of the still-available op-code. If an instruction with an address is indeed involved, then in block 344 a check is made as to whether a relative address is involved. If so, in block 346 the absolute address is calculated from the relative address and the current address (the first address following the end of the current instruction. In block 348 the absolute address thus found is displayed possibly together with a following indication: (a) an asterisk, to indicate that an indirect address is involved, (b) an indication of an index register and an indication of an additional increment or decrement (e.g. 2540+x3+1 on the fifth text line in FIG. 5).

All this takes place on the basis of the known structure of the instruction set of the 2650 Signetics microprocessor.

After the address a tabulation follows again. Then in block 350 a check is made as to whether the address in question points to sub-routine wherein the corresponding title is extracted (if possible) and displayed. Then comes a check in block 352 as to whether a branching instruction is involved. If so, one line space is displayed (block 353). This improves the readability of the display. In block 354 the apparatus goes to a new line and block 336 is reached once more.

If in block 342 the check shows that no instruction with an address is involved, in block 356 a check is made as to whether an instruction with data information is involved. If so in block 358 a tubulation is first made and then the data are displayed in binary code. Then block 354 is reached once more.

The program of FIG. 5 is intended as a demonstration program; it contains no syntactic errors and in itself it fulfils no useful function. FIG. 6 shows how compactly the program is expressed in machine code; less than a half of the memory space is used therefor and the rest is filled up by additional data.

The invention has been explained in the foregoing on the basis of a simple and advantageous implementation using a Signetics 2650 microprocessor. Other processors can be used. The invention is not restricted to instructions of variable length.

What is claimed is:

1. A computer system comprising as subsystems:
   a. a program memory having a sequence of address locations for storing respective machine code data;
   b. a keyboard;
   c. a display device for displaying at least one row of alphanumeric characters;
   d. a processor:
      and interconnecting means for interconnecting said subsystems;
      wherein said processor contains at least:
      an address register having an increment input for addressing the program memory;
      an instruction register having op code storage means (205) and further storage means (207, 256) for together storing an instruction of at most a predetermined length, said instruction register having an instruction input for coupling to an instruction output of said program memory;
      first and second instruction decoder means connected to instruction outputs of said opcode storage means and said further storage means, respectively;
      an execution element having a control input connected to a control output of said first instruction decoder for executing a data processing operation;
      an address distance detector for detecting a predetermined address distance as traversed in said program memory, the maximum range of said address distance being longer than corresponds to an address distance covered in completely filling said instruction register, said address distance detector having an activation input connected to an activation output of said first instruction decoder for receiving an activation signal under control of a first opcode subset (110001xx) detected, and for thereupon receiving via first means (209) from the instruction register a first address distance to be covered in the program memory and then generating a first control signal (296);
      wherein said address distance detector has second means (298) for monitoring a relative address distance as covered in the program memory after reception of said activation signal and upon reaching said first address distance generating a deactivation signal (304) and terminating said first control signal;
      and wherein said processor is responsive to said first control signal for being driven into a nonactive mode for information received from the program memory thereof until generation of said deactivation signal.

2. Computer system according to claim 1, in which a first-in, first-out, buffer (FIFO) is present (300) with an input connected to an output of the program memory and a load input to receive continuously said first control signal upon each addressing of the program memory.

3. Computer system according to claim 1 or 2, in which said second instruction decoder is provided with a first signal output to indicate as an address datum a word read out from the program memory under control of a first specific opcode (C4, 11000100) belonging to said pre-determined opcode set, in cooperation with said first control.

4. Computer system according to claim 1 or 2, in which said second instruction is provided with a second signal output to identify a word read-out from said program memory as a data element, under the control of a second specific opcode (C5, 11000101) belonging to said pre-determined opcode set, in cooperation with said first control signal.

5. Computer system according to claim 1 or 2, in which said second instruction decoder is provided with a third signal output to identify a word read out from said program memory as text data, under the control of a third specific opcode (C6, 11000110) belonging to said pre-determined opcode set, in cooperation with said first control signal.

6. Computer system according to claims 1 or 2, in which said second instruction decoder is provided with a fourth signal output to identify a word read out from said program memory as a title, under the control of a fourth specific opcode (C7, 11000111) belonging to said pre-determined opcode set, in cooperation with said first control signal.

7. Computer system according to claims 1 or 2, in which said de-activating signal (304) acts as a first stop-signal (294) for said address register and that said keyboard is provided with fourth means (e.g. spacing bar) to make said first stop-signal inoperative by means of a second control signal (270).

8. Computer system according to claim 7, in which said keyboard is provided with fifth means, with the aid of a third control signal, to render said first stop-signal continuously inoperative, and in which address-comparing means are present to terminate said third control signal and to generate a second stop-signal for said address register when a final address is reached by said address register.

* * * * *